United States Patent Office 3,509,105
Patented Apr. 28, 1970

3,509,105
POLYAMIDE COPOLYMERS OF AROMATIC
AMINO ACID AND ALICYCLIC AMINO
ACID
Jack Raymond Pedersen, Parsippany, N.J., assignor to
Allied Chemical Corporation, New York, N.Y., a corporation of New York
No Drawing. Filed Jan. 24, 1966, Ser. No. 522,346
Int. Cl. C08g 20/00
U.S. Cl. 260—78                                    10 Claims

ABSTRACT OF THE DISCLOSURE

Fiber and film forming copolyamides of a meta- or para-substituted alicyclic amino acid monomer and a meta- or para-substituted aromatic amino acid monomer including one meta-substituted and one para-substituted monomer, wherein at least 18 mol percent of the units present in the copolyamide are para-substituted and at least 35 mol percent of the units present in the copolyamide are meta-substituted.

---

This invention relates to novel polyamide copolymers and the preparation thereof. Mor particularly, this invention relates to copolymers of amine-substituted aromatic acids with amine-substituted alicyclic acids.

Polymers prepared from aromatic amino acids are generally crystalline materials which are resistant to high temperatures. However, such polymers have been of limited utility because of their high melting points, usually well over 300° C., which exceed the operating temperatures of conventional fabricating equipment and the fact that most of these polymers decompose at or near their melting points. Typical of such aromatic polymers are the homopolymer or benzylamine-3-carboxylic acid which melts at about 340° C. with decomposition and the homopolymer of benzylamine-4-carboxylic acid which melts at about 370° C. with decomposition. In a similar manner, homopolymers of alicyclic amino acids have also been of limited utility because of high melting points and fabricating difficulties. For example, the homopolymer of 4-aminomethylcyclohexanecarboxylic acid melts at about 370° C. with decomposition.

It is, therefore, an object of the present invention to provide useful polymers employing as monomers amine-substituted aromatic acid and amine-substituted alicyclic acid.

Another object of this invention is to provide polymers from the above monomers which melt at less than 300° C. to form stable melts that can be readily shaped by conventional means such as molding and extrusion.

Additional objects and advantages of this invention will be apparent from the following detailed description thereof.

In accordance with the present invention, novel polyamides are prepared by the copolymerization of an alicyclic monomer of the formula:

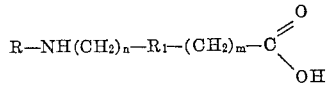

where R is a member selected from the group consisting of hydrogen and acyl groups, $R_1$ is a divalent radical selected from the group consisting of

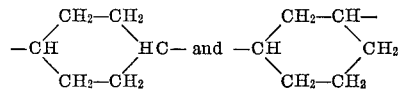

and $m$ and $n$ are integers of 0 to 3, and an aromatic monomer of the formula:

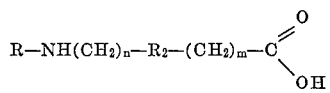

where $R_2$ is a divalent radical selected from the group consisting of:

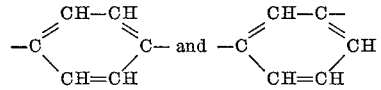

and R, $m$ and $n$ have the meanings given above, with one of said monomers having the amine substituent meta to the carboxyl-containing substituent and the other monomer having the amine substituent para to the carboxyl-containing substituent, i.e., a meta-substituted alicyclic acid is always employed with a para-substituted aromatic acid and a para-substituted alicyclic acid is always employed with a meta-substituted aromatic acid. The proportions of monomers employed are such that the copolymer produced contains at least 18 mol percent of para-substituted monomer and at least 35 mol percent of meta-substituted monomer. The copolymers are glassy materials having melting points of about 180° to 298° C. Preferred copolymers contain a minimum of 40 mol percent of meta-substituted monomer and 20 mol percent of para-substituted monomer and melt within a range of 180° to 260° C. The copolymers of this invention have excellent thermal stability and can be maintained in the melt at temperatures up to 300° C. for several hours without decomposition. As a result, the copolymers can be readily formed into shaped articles such as fibers and films by molding and extrusion.

The copolymers of the present invention can be prepared by heating a mixture of the required monomers under an inert atmosphere to a temperature between 200° C. and the decomposition temperature of the copolymer. Preferably the polymerization is carried out at a temperature between the melting point of the polymer and 300° C. When all of the monomers employed are amino acids, i.e., R in the above formula is always hydrogen and the mol ratio of para-substituted amino acid to meta-substituted amino acid is about 18:82 to 65:35, a condensation type reaction occurs whereby water is split off and a polymer is formed containing the units

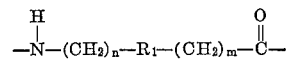

and

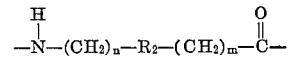

where $R_1$ and $R_2$ have the meanings given above. The polymer chain thus produced is terminated at one end by an amino group and at the other end by a carboxyl group.

All or part of the amino acids can be replaced by their N-acylated derivatives. In the preferred N-acyl compounds, the acyl group is derived from a fatty acid of 1 to 6 carbon atoms. Upon heating the N-acylated compounds, the above-described polymeric units are formed by the splitting off of an acid as illustrated by the following equation in which the acylated compound is N-acetyl benzylamine-3-carboxylic acid.

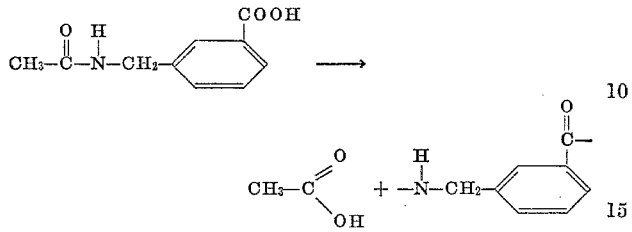

To facilitate the removal of the acid from the reaction mixture, it is advantageous to have a reduced pressure in the system at least during the latter steps of the polymerization. When an N-acylated compound is employed, all or part of the polymer chains are terminated at one end with an acyl group instead of an amino group. Such termination is recommended where the copolymer is to be admixed or otherwise contacted with a compound which reacts with an amino group.

The copolymers of this invention can also be modified by replacing the carboxy terminal group with a less reactive terminal group. This can be accomplished by adding to the reaction mixture an amino compound such as a compound of the formula $R_3NH_2$, where $R_3$ is a monovalent hydrocarbon group free of aliphatic unsaturation. Such compounds can be added in amounts up to about 10 mol percent of the polymeric reaction mixture. Illustrative of suitable amino compounds are benzylamine, α-phenylethylamine, ethylamine, isopropylamine, n-heptylamine, aniline, p-toluidine, and cyclohexylamine.

Another method of reducing the number of carboxyl terminal groups present in the copolymer is to react the copolymer with a diamine of the formula $NH_2R_4NH_2$, where $R_4$ is a divalent hydrocarbon group free of aliphatic unsaturation. Illustrative of such diamines are m-xylylene diamine; ethylenediamine; 1,5-pentanediamine; p-phenylene diamine; and 1,4-diaminocyclohexane. The amino groups react with the carboxyl groups of two polymer chains linking them together to form a higher molecular weight polymer. The diamine can be employed in an amount up to about 10 mol percent of the copolymer. The reaction can be carried out at a temperature ranging from the melting point of the copolymer to the copolymer decomposition temperature. Preferably, the maximum reaction temperature is about 300° C.

Illustrative of para-substituted alicyclic monomers suitable for use in the present invention are 4-aminocyclohexanecarboxylic acid, 4-aminocyclohexaneacetic acid, 4-aminocyclohexanebutyric acid, 4-aminomethylcyclohexane carboxylic acid, 4-aminomethylcyclohexaneacetic acid, 4-aminopropylcyclohexanebutyric acid, and the N-formyl, N-acetyl, N-propionyl and N-capronyl derivatives thereof.

Suitable para-substituted aromatic monomers include p-aminobenzoic acid, benzylamine-4-carboxylic acid, p-aminoethylbenzoic acid, p-aminopropylbenzoic acid, p-aminophenylacetic acid, p-aminophenylpropionic acid, p-aminophenylbutyric acid, benzylamine-4-acetic acid, benzylamine-4-propionic acid, p-aminopropylphenylpropionic acid, and the N-formyl, N-acetyl, N-propionyl and N-capronyl derivatives thereof.

Illustrative of meta-substituted alicyclic monomers suitable for use in the present invention are 3-aminocyclohexanecarboxylic acid, 3-aminocyclohexaneacetic acid, 3-aminocyclohexanebutyric acid, 3-aminomethylcyclohexanecarboxylic acid, 3-aminomethylcyclohexaneacetic acid, 3-aminopropylcyclohexanebutyric acid, and the N-formyl, N-acetyl, N-propionyl and N-capronyl derivatives thereof.

Suitable meta-substituted aromatic monomers include m-aminobenzoic acid, benzylamine-3-carboxylic acid, m-aminoethylbenzoic acid, m-aminopropylbenzoic acid, m-aminophenylacetic acid, m-aminophenylpropionic acid, m-aminophenylbutyric acid, benzylamine-3-acetic acid, benzylamine-3-propionic acid, m-aminopropylphenylpropionic acid, and the N-formyl, N-acetyl, N-propionyl and N-capronyl derivatives thereof.

A particularly outstanding embodiment of the present invention is obtained by reacting 20 to 60 mol percent of an alicyclic monomer of the formula:

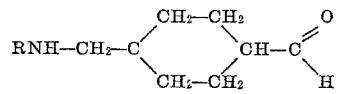

where R is selected from the group consisting of hydrogen and acyl groups derived from a fatty acid of 1 to 6 carbon atoms and 40 to 80 mole percent of an aromatic monomer derived from a compound of the formula:

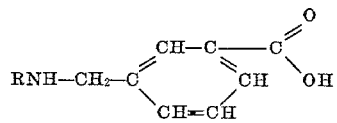

where R has the meaning given above.

The following examples are given to further illustrate the invention, but it is to be understood that the invention is not to be limited in any way by the details described therein.

EXAMPLE 1

Run 1

60.4 grams of 4-aminomethylcyclohexanecarboxylic acid and 77.2 grams of N-acetyl benzylamine-3-carboxylic acid (mol ratio of 1 to 1) were mixed and added to a reaction vessel equipped with a mechanical stirrer, gas inlet and outlet tubes, a distillation head and receiver, and a vacuum line. The vessel was heated to 260° C. in an oil bath maintaining the reactants under a nitrogen atmosphere. The distillation of water and acetic acid subsided after 1½ hours following which the pressure in the vessel was reduced to 0.2 mm. of Hg. The vessel was then heated at about 265° C. for 18 hours under the reduced pressure. A hard glass-like polymer was obtained having a melting point of 220°–235° C. and a reduced viscosity of 0.46 as measured in a 1% solution in concentrated sulfuric acid at 25° C.

A sample of the polymer was extruded at 270° C. to give a monofil having a diameter of 20 mils. The filament was then mechanically drawn in a ratio of 3/1 at a temperature of 150° C. The filament had the following physical properties: ultimate elongation=17%; ultimate tensile strength=2.3 grams/denier; and tensile modulus=57.6 grams/denier.

Run 2

4.71 grams of 4-aminomethylcyclohexanecarboxylic acid and 13.51 grams of N-acetyl benzylamine-3-carboxylic acid (mol ratio of 3 to 7) were added to the reaction vessel employed in Run 1 and a nitrogen atmosphere established. The vessel was heated at about 285° C. for 1 hour following which the pressure in the vessel was reduced to 0.1 mm. Hg. The vessel was then heated at about 260° C. at the reduced pressure for about 15 hours. A hard glassy polymer was obtained having a melting point of 200°–212° C. and a reduced viscosity of 0.26 as measured in a 1% solution in concentrated sulfuric acid at 25° C.

Run 3

10.4 grams of 4 - aminomethylcyclohexanecarboxylic acid and 7.7 grams of N-acetyl benzylamine-3-carboxylic acid (mol ratio of 6 to 4) were polymerized in accordance with the procedure of Run 2. A polymer was obtained having a melting point of 230°–245° C. and a reduced viscosity of 0.22 in a 1% solution in concentrated sulfuric acid at 25° C.

Run 4

As a comparison, this run was made employing a proportion of reactants outside the range of the present invention. 55 grams of 4-aminomethylcyclohexanecarboxylic acid and 23 grams of benzylamine-3-carboxylic acid (mol ratio of 7 to 3) were added to the reaction vessel of Run 1 and a nitrogen atmosphere was established. The vessel was heated to a temperature of 265° C. and then gradually raised to 300° C. over a period of 1 hour. The pressure in the vessel was reduced to 0.1 mm. Hg and heating continued at about 340° C. for 1¼ hours. A polymer was obtained having a melting point of 320°–350° C. and a reduced viscosity of 0.56 in a 1% solution in concentrated sulfuric acid at 25° C.

Run 5

As a comparison, this run was made employing a para-substituted alicyclic acid and a para-substituted aromatic acid. 62.8 grams of 4-aminomethylcyclohexanecarboxylic acid and 77.2 grams of N-acetyl benzylamine-4-carboxylic acid (mol ratio of 1 to 1) were added to the reaction vessel of Run 1 and a nitrogen atmosphere was established. The vessel was heated at about 270° C. for 2 hours following which the pressure in the vessel was reduced to 0.1 mm. Hg. The vessel was then heated at about 260° C. for 20 hours at the reduced pressure. A polymer was obtained having a melting point of 360°–370° C. and a reduced viscosity of 0.29 in a 1% solution in concentrated sulfuric acid at 25° C.

Run 6

Equimolar portions of 3-aminomethylcyclohexanecarboxylic acid and N-acetyl benzylamine-4-carboxylic acid are reacted in accordance with the procedure of Run 1. A copolymer is obtained having a melting point of about 220°–230° C. and a reduced viscosity about 0.4 in a 1% solution in concentrated sulfuric acid at 25° C.

EXAMPLE 2

23.6 grams of 4-aminomethylcyclohexanecarboxylic acid and 26.8 grams of N-acetyl-m-aminobenzoic acid (mol ratio of 1 to 1) were added to a reaction vessel of the type described in Example 1 and a nitrogen atmosphere was established. The vessel was heated at about 285° C. for 1 hour following which the pressure in the vessel was reduced to 0.1 mm. of Hg. The vessel was then heated at 285° C. for 2 hours. A hard polymer was obtained having a melting point of 237°–250° C. and a reduced viscosity of 0.22 in a 1% solution in concentrated sulfuric acid at 25° C.

EXAMPLE 3

60.4 grams of 4-aminomethylcyclohexanecarboxylic acid, 77.2 grams of N-acetyl benzylamine-3-carboxylic acid and 3 grams of benzylamine are reacted in accordance with the procedure of Run 1 of Example 1. A hard glass-like polymer is obtained which is characterized by having few carboxyl end groups.

EXAMPLE 4

50 grams of polymer obtained by the procedure of Run 1 of Example 1 is admixed with 1.4 grams of m-xylylene diamine under a nitrogen atmosphere. The reaction mixture is heated at 270° C. for 2 hours and 45 minutes under the following pressures:

(1) Atmospheric (N$_2$) for 60 minutes.
(2) 20 mm. Hg for 45 minutes.
(3) 3 mm. Hg for 30 minutes.
(4) 0.2 mm. Hg for 30 minutes.

A polymer is obtained having fewer carboxyl end groups than the polymer of Run 1 of Example 1.

The comparative runs of Example 1 illustrate the criticality of some of the above-defined limitations relating to the monomers used to practice this invention. In Run 4, less than 35 mol percent of meta-substituted monomer was employed and the resulting copolymer melted at a temperature of over 300° C. In Run 5, a copolymer was prepared from an aromatic monomer and an alicyclic monomer both of which were para-substituted. The copolymer was found to melt at about 360°–370° C. which is about the same temperature at which homopolymers of the individual monomers melt.

It will be apparent that many modifications and variations may be effected without departing from the scope of the novel concepts of the present invention, and the illustrative details disclosed are not to be construed as imposing undue limitations on the invention.

I claim:

1. A fusible copolyamide consisting essentially of repeating alicyclic units of the formula

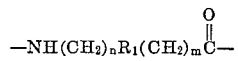

wherein R$_1$ can be

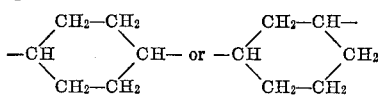

and $m$ and $n$ independently are integers from 0–3; and repeating aromatic units of the formula

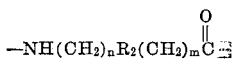

wherein R$_2$ can be

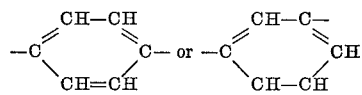

and $m$ and $n$ have the meanings given above, said copolyamide containing 35–82 mol percent of meta-substituted units and 18–65 mol percent of para-substituted units.

2. A fiber of the copolyamide of claim 1.
3. A film of the copolyamide of claim 1.
4. A fusible copolyamide of the formula

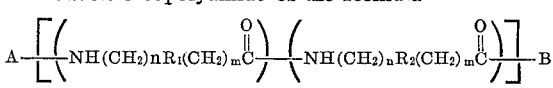

wherein A is a terminal end group attached to a nitrogen atom and can be hydrogen or an acyl radical; B is a terminal end group attached to a carbonyl group and can be hydroxyl or the residue of a hydrocarbon mono- or diamine free of aliphatic unsaturation said residue obtained by removal of an amino hydrogen atom; $m$ and $n$ independently are integers from 0–3; R$_1$ can be

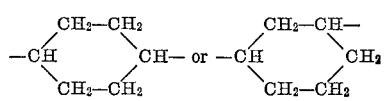

R$_2$ can be

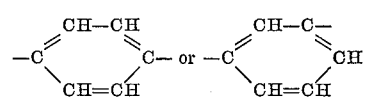

said copolyamide containing from 35–82 mol percent of meta-substituted units and from 18–65 mol percent of para-substituted units.

5. A copolyamide according to claim 4 wherein said amine is benzylamine.
6. A copolyamide according to claim 4 wherein said amine is m-xylylene diamine.
7. A copolyamide according to claim 4 wherein A is acetyl.
8. A copolyamide according to claim 4 containing from 40–80 mol percent of meta-substituted units and from 20–60 mol percent of para-substituted units.
9. A copolyamide according to claim 8 wherein $n$ is 1 and $m$ is 0.

10. A copolyamide according to claim 9 wherein $R_1$ is
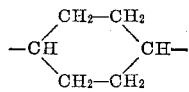
and $R_2$ is
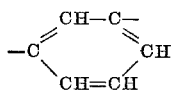
References Cited
UNITED STATES PATENTS
| | | | |
|---|---|---|---|
| 2,071,253 | 2/1937 | Carothers | 260—78 |
| 2,174,527 | 10/1939 | Peterson | 260—78 |
| 2,277,152 | 3/1942 | Schlack | 260—78 |
| 2,356,516 | 8/1944 | Hagedorn | 260—78 |
| 2,688,011 | 8/1954 | Wheatley et al. | 260—78 |
| 2,868,770 | 1/1959 | Temin | 260—78 |
| 2,917,490 | 12/1959 | Caldwell et al. | 260—78 |
| 2,956,987 | 10/1960 | Caldwell et al. | 260—78 |
| 3,109,836 | 11/1963 | Berry | 260—78 |
FOREIGN PATENTS
618,244    4/1961    Canada.
HAROLD D. ANDERSON, Primary Examiner
U.S. Cl. X.R.
260—30.8; 264—210